No. 824,345. PATENTED JUNE 26, 1906.
M. A. ELLIOTT.
VEHICLE HUB.
APPLICATION FILED DEC. 20, 1905.
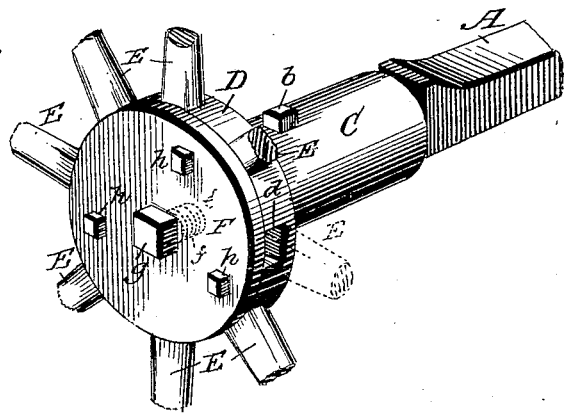
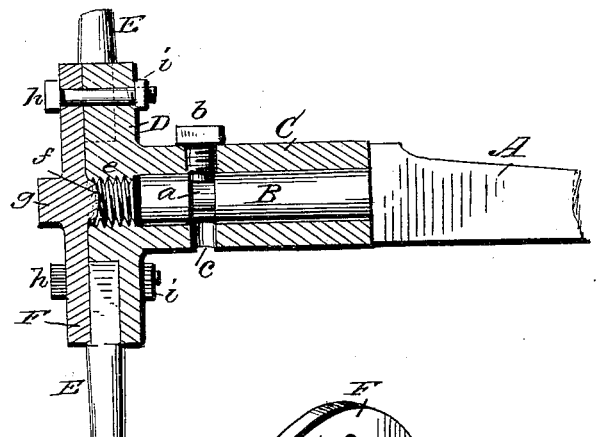
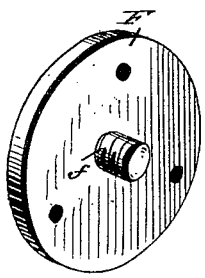
Witnesses
F. H. Hubbard
John E. Burch
Inventor
Milo A. Elliott
By Chas. H. Fowler
Attorney

UNITED STATES PATENT OFFICE.

MILO A. ELLIOTT, OF WATERVILLE, MAINE.

VEHICLE-HUB.

No. 824,345.        Specification of Letters Patent.        Patented June 26, 1906.

Application filed December 20, 1905. Serial No. 292,565.

*To all whom it may concern:*

Be it known that I, MILO A. ELLIOTT, a citizen of the United States, residing at Waterville, in the county of Kennebec and State of Maine, have invented certain new and useful Improvements in Vehicle-Hubs; and I do hereby declare that the following is a full, clear, and exact description of the same, reference being had to the annexed drawings, making a part of this specification, and to the letters of reference marked thereon.

The present invention has relation to that class of vehicle-hubs in which the spokes are held in radial sockets or grooves by means of a clamping-plate; and the object thereof is to improve the construction of the clamping-plate whereby it will be both effective and readily brought in contact with the spokes or plates of the hub to form a perfect clamp in holding the spokes perfectly rigid and secure in the hub.

The invention consists in a vehicle-hub constructed substantially as shown in the drawings and herein described and claimed.

Figure 1 of the drawings is a perspective view of a vehicle-hub constructed in accordance with my invention; Fig. 2, a sectional elevation thereof; Fig. 3, a perspective view of the clamping-plate to hold the spokes to the hub.

In the accompanying drawings, A represents the axle, and B the spindle or journal thereof, upon which is supported the sleeve or box C of the hub D, all of which may be of the usual construction. The spindle or journal B has a circumferential groove $a$, with which engages a set-screw $b$, which passes through a screw-hole in the sleeve or box, so that the same will be allowed to revolve or rotate on the spindle or journal, but held against longitudinal movement. The sleeve or box C has a hole $c$ through it for the purpose of lubricating the spindle or journal B, as circumstances require, and the hub D has radial sockets $d$, in which are seated the spokes E of the wheel. The spindle or journal B is of a length to extend into the sleeve or box C only a portion of its length, and between the end of the spindle or journal and the outer face of the hub D is a screw-threaded socket $e$ to receive the screw-threaded nipple $f$, which projects from the inner side of a clamping-plate F, which in circumference corresponds with the circumference of the hub. After the spokes have been placed in position within the radial sockets of the hub the screw-nipple $f$ is engaged with the screw-threaded socket $e$, and by means of the flat-sided boss $g$ upon the outer side of the clamping-plate F a suitable wrench or tool is engaged therewith and the plate screwed up tightly against the hub and spokes.

After the clamping-plate has been tightly screwed up against the spokes and hub the plate is held from turning by means of the bolts $h$, which extend through holes in the plate and hub and secured by nuts $i$, engaging the screw-threaded ends of the bolts.

The screw-nipple $f$ and flat-sided boss $g$ are integral with the clamping-plate F, or, in other words, formed from one and the same piece of metal, which is considered of material importance in simplifying the construction of the plate as well as rendering it a perfect clamp for holding the spokes in place. The screw-nipple and boss upon the opposite sides of the clamping-plate being integral therewith a greater part of the strain upon the plate is at the center or axis thereof which forms a perfect clamp, the bolts and nuts serving only to hold the plate against moving upon its axis.

Having now fully described my invention, what I claim as new, and desire to secure by Letters Patent, is—

1. A vehicle-hub having radial sockets and spokes seated therein, a screw-threaded socket in the end of the hub, and a clamping-plate having a screw-threaded nipple to engage the screw-threaded socket, and a boss upon the outer side of the plate, said nipple and boss being integral with the plate, substantially as and for the purpose set forth.

2. An axle having a spindle with circumferential groove therein, a hub with sleeve located upon the spindle and a set-screw passing through the sleeve and engaging the groove in the spindle and an opening through the sleeve for lubricant, and a clamping-plate to hold the spokes between it and the hub and having a screw-nipple and a boss upon its opposite sides and integral with the plate as and for the purpose specified.

In testimony whereof I affix my signature in presence of two witnesses.

MILO A. ELLIOTT

Witnesses:
    WILLIAM HOYT,
    CHARLES W. ATCHLEY.